Nov. 5, 1929. A. A. CLARKE Re. 17,482
WORK ENGAGING SUPPORT FOR SURFACE TREATING MACHINES
Original Filed Jan. 13, 1920
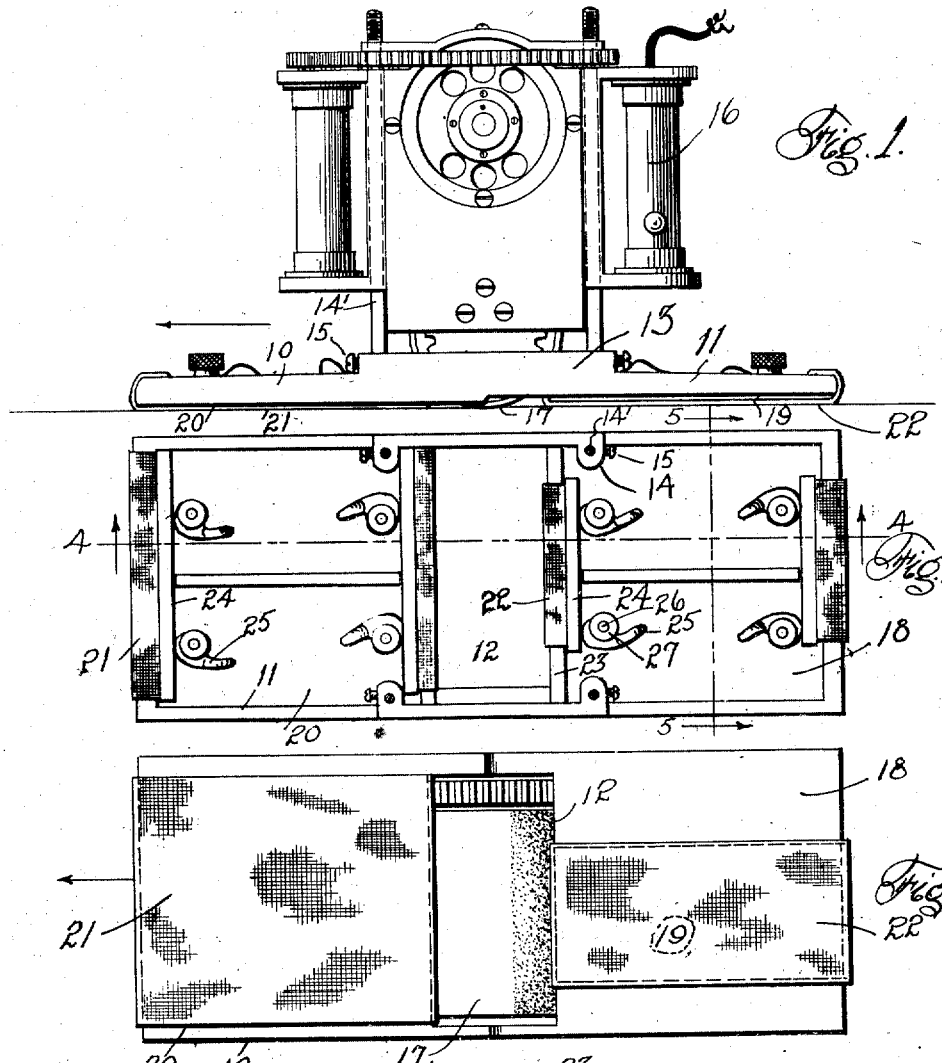
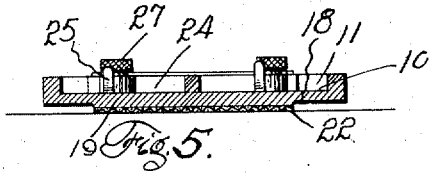
Inventor
A. A. Clarke
By Cromwell, Secrest & Warden
Attorney Reissued Nov. 5, 1929

Re. 17,482

UNITED STATES PATENT OFFICE

ALEX A. CLARKE, OF CHICAGO, ILLINOIS

WORK-ENGAGING SUPPORT FOR SURFACE-TREATING MACHINES

Original No. 1,366,633, dated January 25, 1921, Serial No. 351,156, filed January 13, 1920. Application for reissue filed January 29, 1923. Serial No. 615,749.

This invention relates to new and useful improvements in work engaging supports for surface treating machines.

This invention has particularly to do with surface treating machines involving a revolving surface treating member. The idea involved is to provide an adequate support both in advance of and following the revolving member whereby the machine is held steadily and evenly and the entire surface extending to the edges of the work, may be treated without variation in finish or deviation in depth of cut. It is obvious that the work of finishing or removing a finish from a flat surface, must be performed in courses or parallel paths and if the revolving surface treating member was permitted to tilt down at one end, uneven and scored work would be done. It is the object of the invention to do the work in courses and to do it so perfectly, that the courses may be overlapped without visible effect after the work is completed.

It is also the object of the invention to properly support the machine on the work so that the treating member may be started at one end and carried to the other end without tilting or uneven cutting.

In carrying out the invention a base member is provided with a transverse opening intermediate its ends, for receiving a surface treating drum and exposing the underside of the latter to the work. That portion of the base in front of the opening may be termed the "advance" portion and that portion in rear of the opening, may be termed the "following" or "trailing" portion. One of the features resides in providing a shoe on the following portion of less width than the advance portion and also of a width less than the length of the drum; whereby the following portion will always be supported upon worked surface and the chance of being supported partly on worked or sanded surface and partly upon unworked surface, which would tilt the device and cause the drum to cut deeper at one side, is eliminated. The advance portion and the shoe may each have a covering of soft fabric or other suitable material to hold the metal out of contact with the working surface and prevent marring of the latter. These coverings may be suitably fastened so as to be removable.

The invention will be more readily understood from a reading of the following specification and by reference to the accompanying drawings, in which an example of the invention is shown, and wherein:

Fig. 1 is an elevation of a surface treating machine equipped with a base constructed in accordance with this invention, Fig. 2 is a plan view of the base, Fig. 3 is an underside view of the same, Fig. 4 is a longitudinal sectional view on the line 4—4 of Fig. 2, and Fig. 5 is a transverse sectional view on the line 5—5 of Fig. 2.

In the drawings the numeral 10 designates an elongated base member which I preferably form as a plate with an upstanding marginal flange 11 on its upper side, extending entirely around the plate. At the central portion of the plate a transverse opening or slot 12 is provided. At each end of the slot the flange 11 is built up at 13 and inwardly directed ears 14 are made integral with the portion 13, flange 11 and base plate. These ears receive the lower ends of posts 14′ which are fastened therein by set screws 15 or any other means. The manner of attaching the base to the machine is optional and may be changed in accordance with the machine used.

I have shown a frame 16 vertically adjustable in the posts and provided with a motor driven drum 17 which latter projects through the slot 12. Illustrated and described in my Letters Patent No. 1,390,501 issued Sept. 13, 1921. The drum is rapidly revolved and has a surface covering of sand paper, or polishing cloth or other material according to the class of work to be done. Machines of this character are used in sanding new and old wooden surfaces and also for polishing finished surfaces.

The machine is moved in direction of the arrows. As shown in the drawings, the base has a flat guiding surface or shoe 20 in advance of the surfacing drum 17, and a flat guiding surface or shoe 19 in the rear of the drum. The front shoe has a width exceeding the length of the surfacing drum 17 and has two tongues 20′ extending rearwardly on both sides of the drum 17 to near the center line or cutting edge of the drum, these tongues lying in the same plane as the front portion of the shoe. Through this arrangement, the drum has a firm and stable support on the advance shoe 20 until the very moment when the drum is about to leave the edge of a treated surface. The rear shoe 19 is of lesser width than the length of the drum, the side portion 18 at the rear surface of the base being cut away so that only the central shoe 19 is in contact with the work surface. A strip of soft fabric 21 may be employed as a covering for the advance portion and a similar strip 22 may be used to cover the shoe 19. Each strip has one end passed up through the slot 12 and folded back over a transverse rib 23 contiguous to the edge of said slot; while the other end of the strip is folded over the flange 11 at the end of the plate. Transverse fastening bars 24 are pressed against the ends of the cloth by eccentric latches 25 pivoted on studs 26 projecting up from the plate 10. The latches are confined on the studs by nuts 27. By turning the latches the ends of the strips are released and the strips may be removed or tightened. It is obvious that the manner of fastening the ends of the strips permits of great variation.

When the machine is in use the strip 21 of the advance portion 20 is always resting on the untreated surface; while the strip 22 of the shoe is resting on the surface which has been treated. By making the strip 22 and shoe 19 narrow so that the ends of the drum project on each side of the said parts and by elevating the portion 18 from the center of the slot 12 rearwardly, all liability of the rear portion of the base resting on an untreated portion of the surface, is obviated. It is obvious that if the surface was being removed to a depth of one-thirty-second of an inch and one side of the rear portion rested on uncut surface and the other on cut surface, the drum would be disposed one-thirty-second of an inch lower at one end than at the other end, consequently an uneven cut resulting in scores would be had. The advance portion is ample enough to firmly support the machine on the margin of a surface and as the machine is moved forward the drum will be carried onto the edge of the surface. Likewise the shoe is sufficient to support the machine until the work is carried to the opposite edge. By the arrangement the entire surface may be worked.

It is obvious that the base may be used without the said fabric covering and in some instances it might be desirable to leave off said covering and employ the portions 19 and 20 for support.

What I claim, is:

1. In a machine of the character described, a base having a substantially flat advanced portion and a trailing portion, said base having a transverse opening between said portions, said advanced portion extending for substantially the entire length of the transverse opening, a frame arranged upon and carried by the base, a rotatable surface treating element carried by the frame and projecting into the transverse opening and extending downwardly beyond the opening, means to drive the rotatable surface treating element, and a shoe carried by and depending from the trailing portion, said shoe having its longitudinal edges disposed inwardly for substantial distances from the ends of the rotatable surface treating element so that either longitudinal edge may be conveniently retained out of engagement with the untreated portion of the surface.

2. In a machine of the character described, a base having a substantially flat advanced portion and a trailing portion, said base having a transverse opening between said portions, said advanced portion extending for substantially the entire length of the transverse opening, a frame arranged upon and carried by the base, a rotatable surface treating element carried by the frame and projecting into the transverse opening and extending downwardly beyond the opening, said advanced portion having two extensions extending rearwardly on both sides of said rotatable surface-treating element to near the center line thereof, means to drive the rotatable surface treating element, and a shoe carried by and depending from the trailing portion, said shoe having its longitudinal edges disposed inwardly for substantial distances from the ends of the rotatable surface treating element so that either longitudinal edge may be conveniently retained out of engagement with the untreated portion of the surface.

3. In a surfacing machine, a frame, a surfacing drum supported on said frame for contact with the work along a longitudinal edge of said drum in a direction transverse to said frame, means for rotating said drum, an advanced flat base member positioned in front of said drum and having a width greater than the length of the cutting edge of said drum, a trailing flat base member back of said drum and having a width smaller than the length of the cutting edge of said drum, said advanced base member having tongues extending rearwardly on both sides of said drum to points in front of the cutting edge of said drum.

In testimony whereof I affix my signature.

ALEX A. CLARKE.